United States Patent
Harada et al.

(10) Patent No.: US 9,552,758 B2
(45) Date of Patent: Jan. 24, 2017

(54) DISPLAY DEVICE AND IMAGE PROCESSING DEVICE

(71) Applicant: Japan Display Inc., Tokyo (JP)

(72) Inventors: Tsutomu Harada, Tokyo (JP); Hiroki Uchiyama, Tokyo (JP); Toshiyuki Nagatsuma, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/708,406

(22) Filed: May 11, 2015

(65) Prior Publication Data
US 2015/0339966 A1 Nov. 26, 2015

(30) Foreign Application Priority Data

May 23, 2014 (JP) ................................. 2014-107579

(51) Int. Cl.
| | |
|---|---|
| G09G 3/20 | (2006.01) |
| G09G 3/36 | (2006.01) |
| G06T 1/20 | (2006.01) |
| G09G 3/34 | (2006.01) |
| H04N 1/46 | (2006.01) |
| H04N 1/60 | (2006.01) |
| G09G 5/06 | (2006.01) |

(52) U.S. Cl.
CPC ............... *G09G 3/2003* (2013.01); *G06T 1/20* (2013.01); *G09G 3/2092* (2013.01); *G09G 3/3413* (2013.01); *G09G 3/36* (2013.01); *G09G 5/06* (2013.01); *H04N 1/46* (2013.01); *H04N 1/60* (2013.01); *G09G 2300/0452* (2013.01); *G09G 2320/0626* (2013.01); *G09G 2330/021* (2013.01); *G09G 2330/022* (2013.01); *G09G 2340/06* (2013.01); *G09G 2360/144* (2013.01)

(58) Field of Classification Search
None
See application file for complete search history.

(56) References Cited

U.S. PATENT DOCUMENTS 6,459,419 B1 * 10/2002 Matsubayashi .......... G09G 5/02
345/156
8,743,152 B2   6/2014 Sakaigawa
(Continued)

FOREIGN PATENT DOCUMENTS

JP   2010-020241   1/2010
JP   2010-033009   2/2010

*Primary Examiner* — Ryan M Gray
(74) *Attorney, Agent, or Firm* — K&L Gates LLP

(57) ABSTRACT

A display device includes an image processing unit that performs image processing on image data input from the outside, and performs display output corresponding to the image data on which image processing is performed by the image processing unit. The image processing unit includes a first processing circuit that simply replaces colors of an image to limit the number of colors used for the image to a predetermined number equal to or smaller than 16, a second processing circuit that performs image processing including arithmetic processing for improving luminance of a plurality of pixels constituting the image displayed on the display device corresponding to the image data; and a switching unit that causes the second processing circuit to perform image processing, and causes the first processing circuit to perform image processing when performing the image processing while saving more power than the second processing circuit.

8 Claims, 9 Drawing Sheets

(56) References Cited

U.S. PATENT DOCUMENTS

| | | | | |
|---|---|---|---|---|
| 2007/0052861 A1* | 3/2007 | Osawa | ............... | H04N 9/67 |
| | | | | 348/649 |
| 2008/0158117 A1* | 7/2008 | Wong | ............... | G09G 3/20 |
| | | | | 345/87 |
| 2009/0213048 A1* | 8/2009 | Park | ............... | G09G 3/2003 |
| | | | | 345/77 |
| 2009/0315921 A1 | 12/2009 | Sakaigawa et al. | | |
| 2012/0169954 A1* | 7/2012 | Liu | ............... | G09G 3/3611 |
| | | | | 349/38 |
| 2012/0249404 A1 | 10/2012 | Sakaigawa et al. | | |
| 2012/0306905 A1* | 12/2012 | Kim | ............... | G09G 5/02 |
| | | | | 345/589 |
| 2014/0176620 A1* | 6/2014 | Yano | ............... | G09G 3/3208 |
| | | | | 345/690 |
| 2015/0062148 A1* | 3/2015 | Morovic | ............... | G09G 5/06 |
| | | | | 345/593 |

* cited by examiner

FIG.6

| R | G | B | 16 COL-ORS | R | G | B | 16 COL-ORS | R | G | B | 16 COL-ORS | R | G | B | 16 COL-ORS |
|---|---|---|---|---|---|---|---|---|---|---|---|---|---|---|---|
| 0 | 0 | 0 | Blk | 63 | 0 | 0 | Blk | 127 | 0 | 0 | Blk | 255 | 0 | 0 | R |
| 0 | 0 | 63 | Blk | 63 | 0 | 63 | Blk | 127 | 0 | 63 | Blk | 255 | 0 | 63 | R |
| 0 | 0 | 127 | Blk | 63 | 0 | 127 | Blk | 127 | 0 | 127 | Blk | 255 | 0 | 127 | R |
| 0 | 0 | 255 | B | 63 | 0 | 255 | B | 127 | 0 | 255 | B | 255 | 0 | 255 | RB (M) |
| 0 | 63 | 0 | Blk | 63 | 63 | 0 | Blk | 127 | 63 | 0 | Blk | 255 | 63 | 0 | R |
| 0 | 63 | 63 | Blk | 63 | 63 | 63 | RGB | 127 | 63 | 63 | Blk | 255 | 63 | 63 | R |
| 0 | 63 | 127 | Blk | 63 | 63 | 127 | Blk | 127 | 63 | 127 | Blk | 255 | 63 | 127 | R |
| 0 | 63 | 255 | B | 63 | 63 | 255 | B | 127 | 63 | 255 | B | 255 | 63 | 255 | RB (M) |
| 0 | 127 | 0 | Blk | 63 | 127 | 0 | Blk | 127 | 127 | 0 | Blk | 255 | 127 | 0 | R |
| 0 | 127 | 63 | Blk | 63 | 127 | 63 | Blk | 127 | 127 | 63 | Blk | 255 | 127 | 63 | R |
| 0 | 127 | 127 | Blk | 63 | 127 | 127 | Blk | 127 | 127 | 127 | W | 255 | 127 | 127 | RW |
| 0 | 127 | 255 | B | 63 | 127 | 255 | B | 127 | 127 | 255 | BW | 255 | 127 | 255 | RBW (MW) |
| 0 | 255 | 0 | G | 63 | 255 | 0 | G | 127 | 255 | 0 | G | 255 | 255 | 0 | RG (Y) |
| 0 | 255 | 63 | G | 63 | 255 | 63 | G | 127 | 255 | 63 | G | 255 | 255 | 63 | RG (Y) |
| 0 | 255 | 127 | G | 63 | 255 | 127 | G | 127 | 255 | 127 | GW | 255 | 255 | 127 | RGW (YW) |
| 0 | 255 | 255 | GB (C) | 63 | 255 | 255 | GB (C) | 127 | 255 | 255 | GBW (CW) | 255 | 255 | 255 | RGBW |

FIG.15

| R5 | R4 | R3 | R2 | R1 | R0 | W5 | W4 | G5 | G4 | G3 | G2 | G1 | G0 | W3 | W2 | B5 | B4 | B3 | B2 | B1 | B0 | W1 | W0 |

DISPLAY DEVICE AND IMAGE PROCESSING DEVICE

CROSS REFERENCES TO RELATED APPLICATIONS

The present application claims priority to Japanese Priority Patent Application JP 2014-107579 filed in the Japan Patent Office on May 23, 2014, the entire content of which is hereby incorporated by reference.

BACKGROUND

1. Technical Field

The present disclosure relates to a display device and an image processing device.

2. Description of the Related Art

In the related art, known is image processing (expansion processing) for improving luminance of a plurality of pixels constituting an image displayed on a display device corresponding to image data (refer to Japanese Patent Application Laid-open Publication No. 2010-20241).

However, the expansion processing includes an operation for increasing luminance of the entire displayed image corresponding to the image data based on colors of the pixels constituting the image data, so that certain electric power is consumed by the operation. Due to this, a display device including a conventional image processing device that performs such processing on an image or environment in which a user does not expect luminance improvement may consume electric power in vain against an intention of the user.

For the foregoing reasons, there is a need for a display device and an image processing device that can reduce power effectively.

SUMMARY

According to an aspect, a display device includes an image processing unit that performs image processing on image data input from outside, and performs display output corresponding to the image data on which image processing is performed by the image processing unit. The image processing unit includes: a first processing circuit that simply replaces colors of an image to limit number of colors used for the image to a predetermined number equal to or smaller than 16; a second processing circuit that performs image processing including arithmetic processing for improving luminance of a plurality of pixels constituting the image displayed on the display device corresponding to the image data; and a switching unit that causes any one of the first processing circuit and the second processing circuit to perform image processing. The switching unit causes the second processing circuit to perform image processing, and causes the first processing circuit to perform image processing when performing the image processing while saving more power than the second processing circuit.

According to another aspect, an image processing device performs image processing on image data input from outside and outputs the image data to a display device. The image processing device includes: a first processing circuit that simply replaces colors of an image to limit number of colors used for the image to a predetermined number equal to or smaller than 16; a second processing circuit that performs image processing including arithmetic processing for improving luminance of a plurality of pixels constituting the image displayed on the display device corresponding to the image data; and a switching unit that causes any one of the first processing circuit and the second processing circuit to perform image processing. The switching unit causes the second processing circuit to perform image processing, and causes the first processing circuit to perform image processing when performing the image processing while saving more power than the second processing circuit.

Additional features and advantages are described herein, and will be apparent from the following Detailed Description and the figures.

BRIEF DESCRIPTION OF THE FIGURES

FIG. 6 is a diagram illustrating an example of a replacement pattern of colors made by a first processing circuit;

FIG. 15 is a diagram illustrating an example of the input format of the color value designated from the outside;

DETAILED DESCRIPTION

Figure 1:
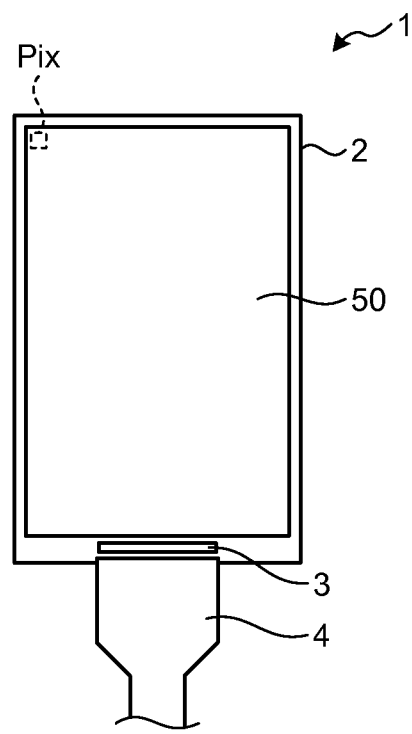
FIG. 1 is a diagram illustrating an example of a form of a display device according to an embodiment of the present invention.

The following describes an embodiment of the present invention with reference to the accompanying drawings. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

Figure 2:
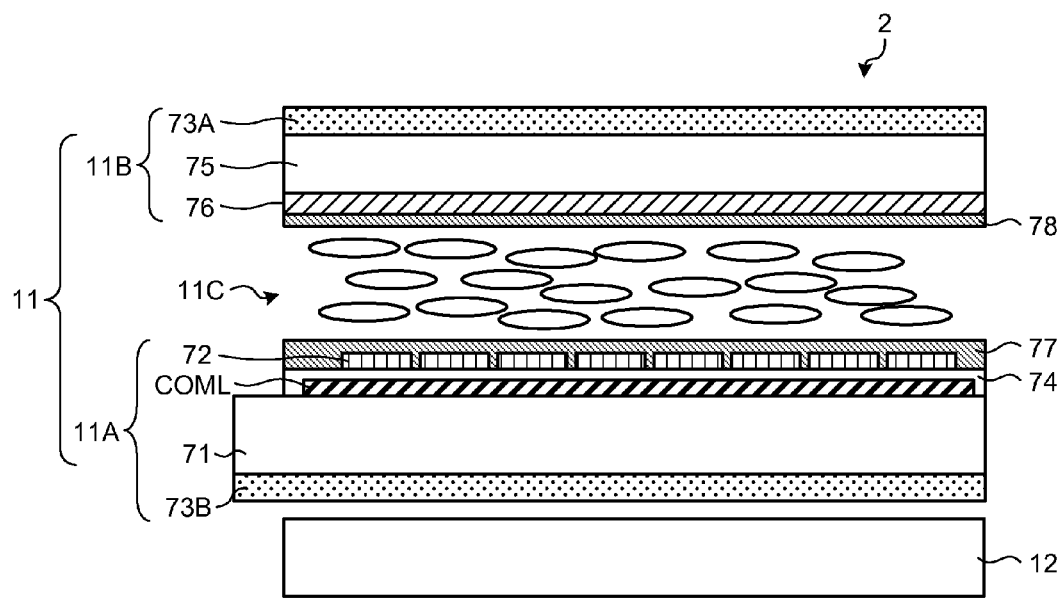
FIG. 2 is a schematic diagram of a cross-sectional structure of a display panel 2.
Figure 3:
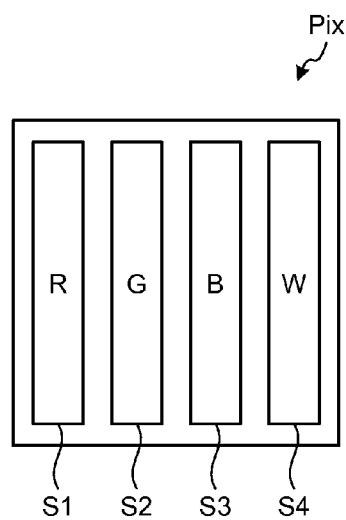
FIG. 3 is a diagram illustrating a configuration example of a pixel.

FIG. 1 is a diagram illustrating an example of a form of a display device 1 according to the embodiment of the present invention. FIG. 2 is a schematic diagram of a cross-sectional structure of a display panel 2. FIG. 3 is a diagram illustrating a configuration example of a pixel Pix. The display device 1 includes the display panel 2 and an image processing unit 3. The display panel 2 is, for example, a panel made with a translucent substrate (such as a glass substrate) constituting a liquid crystal display device. The translucent substrate includes, for example, a pixel substrate arranged in the liquid crystal display device on which wiring (such as a scanning line and a signal line) having a matrix structure is formed, and a counter substrate cooperating with the pixel substrate to sandwich liquid crystals.

The display device 1 according to the embodiment is, for example, a transmissive liquid crystal display device. Specifically, for example, as illustrated in FIG. 2, the display panel 2 according to the embodiment has a multilayer structure 11 in which a pixel substrate 11A and a counter substrate 11B opposed in a direction perpendicular to a surface of the pixel substrate 11A are piled up, and a liquid crystal layer 11C is interposed between the pixel substrate 11A and the counter substrate 11B. In the display panel 2, a distance between the pixel substrate 11A and the counter substrate 11B is substantially 3 μm to 4 μm, for example.

The liquid crystal layer 11C modulates light passing therethrough corresponding to a state of an electric field. Examples of the liquid crystal layer 11C include, but are not limited to, liquid crystals of various modes such as a twisted nematic (TN) mode, a vertical alignment (VA) mode, an electrically controlled birefringence (ECB) mode, and a fringe field switching (FFS) mode.

The counter substrate 11B includes a glass substrate 75 and a color filter 76 formed on one surface of the glass substrate 75. A polarizing plate 73A is arranged on the other surface of the glass substrate 75. The color filter 76 includes color regions colored in three colors, that is, red (R), green (G), and blue (B), and a region corresponding to white as a single color (W). In the color filter 76, for example, the regions in which color filters colored in three colors, that is, red (R), green (G), and blue (B) are arranged, and the region corresponding to the white as a single color (W) are periodically arranged, and the color regions of four colors R, G, B, and W are associated as a group of pixels with each pixel. The color filter 76 is opposed to the liquid crystal layer 11C in a direction perpendicular to a TFT substrate 71. The region corresponding to the white as a single color (W) may include a colorless translucent filter arranged therein or include no filter. The color filter 76 may include a combination of other colors so long as being colored in different colors. A common electrode COML is a transparent electrode formed of transparent conductive material (transparent conductive oxide) such as indium tin oxide (ITO).

The pixel substrate 11A includes the TFT substrate 71 serving as a circuit board, a plurality of pixel electrodes 72 arranged in a matrix on the TFT substrate 71, the common electrode COML formed between the TFT substrate 71 and the pixel electrode 72, an insulating layer 74 that insulates the pixel electrode 72 from the common electrode COML, and an incident-side polarizing plate 73B on a lower surface of the TFT substrate 71. A first orientation film 77 is arranged between the liquid crystal layer 11C and the pixel substrate 11A. A second orientation film 78 is arranged between the liquid crystal layer 11C and the counter substrate 11B. The display panel 2 is driven by a drive circuit (not illustrated), and controls an alignment direction of a liquid crystal molecule in the pixel to display a two-dimensional image corresponding to a video signal from the outside.

An illumination unit 12 that functions as a backlight and emits light is placed on the back surface side of the display panel 2. The illumination unit 12 includes members such as a light source made with a light emitting diode (LED) and the like, a prism sheet, a diffusion sheet, and a light guide plate. The backlight is not limited to the illumination unit 12 including such members, and may include a widely known illumination unit. The display panel 2 performs display output using light from the backlight as a light source. A display unit 50 serving as an image display region in the display panel 2 according to the embodiment extends a color of one pixel (for example, the pixel Pix illustrated in FIGS. 1 and 3) with a combination of four sub-pixels of red (R), green (G), blue (B), and white as a single color (W) (RGBW) (for example, sub-pixels S1 to S4 illustrated in FIG. 3). The pixel Pix in the display unit 50 is schematically illustrated in FIG. 1, and is not drawn to scale.

The pixel Pix illustrated in FIG. 3 is a square pixel including the sub-pixels S1 to S4 having a vertically long rectangular shape. These shapes of the pixel and the sub-pixels are merely an example, and the embodiment is not limited thereto. For example, square sub-pixels may be vertically and horizontally placed in a positional relation of 2 (pixels)×2 (pixels). Any of the sub-pixels may have an opening area larger than that of the other sub-pixel, and any of the sub-pixels may have an opening area smaller than that of the other sub-pixel.

The image processing unit 3 is coupled to the wiring formed on the pixel substrate, and is also coupled to external wiring (for example, a flexible printed board 4 illustrated in FIG. 1) coupled to the display panel 2. The image processing unit 3 performs image processing on image data input from the outside via such external wiring. That is, the display device 1 performs display output corresponding to the image data on which image processing is performed by the image processing unit 3.

In this embodiment, the image data input to the image processing unit 3 is RGB image data. That is, in the embodiment, colors of the pixels constituting the image data input to the image processing unit 3 are represented with a combination of color values of three colors, that is, red (R), green (G), and blue (B) (RGB). The image processing unit 3 according to the embodiment converts the color represented with the combination of the color values of the three colors into a color represented with a combination of four colors, that is, red (R), green (G), blue (B), and white as a single color (W) (RGBW) to be output.

Figure 4:
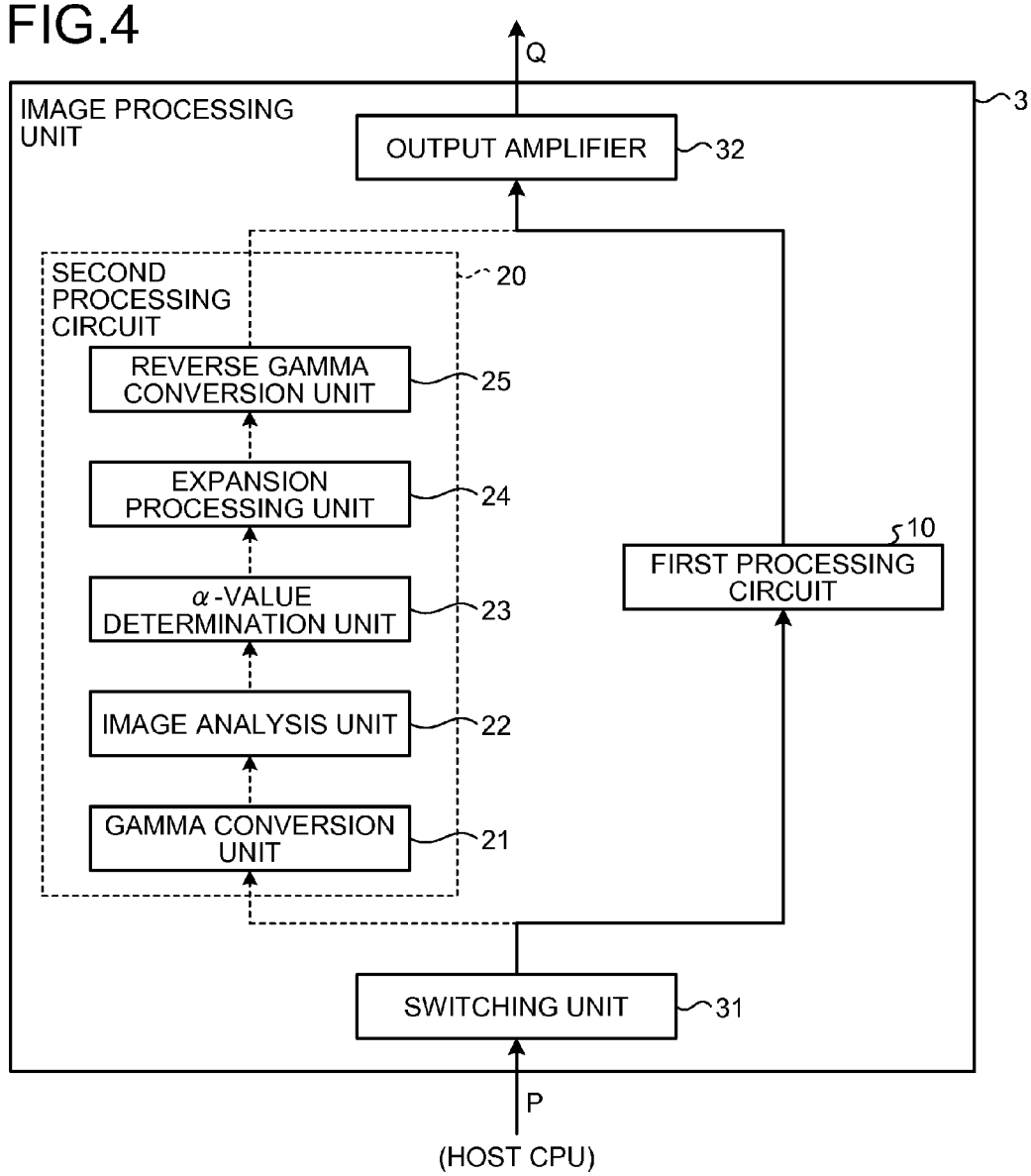
FIG. 4 is a block diagram illustrating a principal function of an image processing unit.

FIG. 4 is a block diagram illustrating a principal function of the image processing unit 3. The image processing unit 3 includes a switching unit 31, a first processing circuit 10, a second processing circuit 20, and an output amplifier 32. The switching unit 31 causes any one of the first processing circuit 10 and the second processing circuit 20 to perform image processing. Each of the first processing circuit 10 and the second processing circuit 20 is a circuit that performs image processing. The image processing performed by the first processing circuit 10 is different from the image processing performed by the second processing circuit 20. Power consumption of the first processing circuit 10 is smaller than that of the second processing circuit 20. That is, more power can be saved in the image processing by the first processing circuit 10 than in the image processing by the second processing circuit 20. The switching unit 31 causes the second processing circuit 20 to perform image processing, and causes the first processing circuit 10 to perform image processing when performing the image processing while saving more power than the second processing circuit 20. Specifically, the switching unit 31 causes the first processing circuit 10 to perform image processing when in a power-saving mode, and causes the second processing circuit 20 to perform image processing when not in the power-saving mode. The "power-saving mode" in the embodiment only represents that more power can be saved in the first processing circuit 10 that performs image processing when in the power saving mode than in the second processing circuit 20, and does not represent that a configuration of the second processing circuit 20 neglects power efficiency (a power-saving property) in performing image processing. The following sequentially describes the first processing circuit 10 and the second processing circuit 20. In FIG. 4, a signal constituting the image input to the image processing unit 3 is denoted by a reference sign P. In FIG. 4, a signal constituting the image after image processing that is output from the image processing unit 3 is denoted by a reference sign Q.

A condition for determining whether it is in the power saving mode can be determined in an optional manner. For example, a setting unit may be provided for setting whether to operate the display device 1 in the power-saving mode. The switching unit 31 causes any one of the first processing circuit 10 and the second processing circuit 20 to perform image processing according to the setting. A parameter indicating whether to display the image corresponding to input image data in the power-saving mode may be added to the image data. The switching unit 31 causes any one of the first processing circuit 10 and the second processing circuit 20 to perform image processing according to the parameter. The switching unit 31 causes any one of the first processing circuit 10 and the second processing circuit 20 to perform image processing according to a certain piece of information indicating whether an operation mode of the display device 1 is the power-saving mode.

The first processing circuit 10 simply replaces colors of the image to limit the number of colors used for the image to a predetermined number equal to or smaller than 16. Herein, "simply replace" means that colors of a plurality of pixels are simply applied to colors the number of which is equal to or smaller than a predetermined number to be output due to a hardware (circuit) configuration without arithmetic processing and the like for improving the luminance of the pixels constituting the image.

The second processing circuit 20 performs image processing including arithmetic processing for improving the luminance of the pixels constituting the image. The image indicates a displayed image that is displayed on the display device 1 corresponding to the image data. Specifically, as illustrated in FIG. 4 for example, the second processing circuit 20 includes a gamma conversion unit 21, an image analysis unit 22, an α-value determination unit 23, an expansion processing unit 24, and a reverse gamma conversion unit 25. The gamma conversion unit 21 performs gamma conversion processing for causing a correspondence relation between gradation of the image and the luminance of the image corresponding to the data to be a predetermined relation. The image analysis unit 22 determines an expansion coefficient value using color values of the pixels constituting the image on which gamma conversion processing is performed. The α-value determination unit 23 determines the expansion coefficient value as a numerical value for improving the luminance of the image using the color values of the pixels constituting the image based on the image data. The expansion processing unit 24 performs expansion processing on the image on which gamma conversion processing is performed for improving the luminance of the image using the expansion coefficient value. The reverse gamma conversion unit 25 returns the correspondence relation between the gradation of the image on which expansion processing is performed and the luminance of the image to the correspondence relation before the gamma conversion processing.

The output amplifier 32 amplifies a signal corresponding to the image data on which image processing is performed that is output from the first processing circuit 10 and the second processing circuit 20, and output the signal to the display unit 50 (for example, a liquid crystal display device) formed on the display panel 2.

Figure 5:
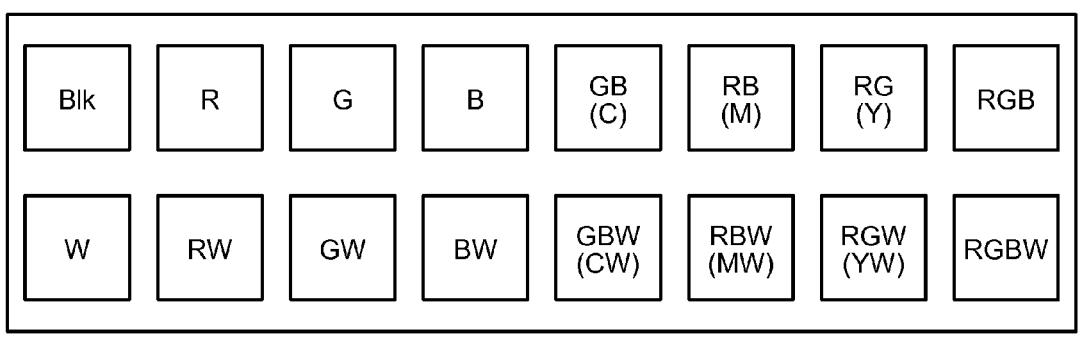
FIG. 5 is a diagram illustrating a combination of sixteen colors adopted in the embodiment.

Next, the following describes the first processing circuit 10 in detail. FIG. 5 is a diagram illustrating a combination of sixteen colors adopted in the embodiment. The first processing circuit 10 according to the embodiment causes each of the colors of the pixels constituting the image to be any of the sixteen colors in total, that is, black (Blk), red (R), green (G), blue (B), cyan (C: GB), magenta (M: RB), yellow (Y: RG), white as a mixed color (RGB), white as a single color (W), pale red (RW), pale green (GW), pale blue (BW), cyan white (CW: GBW), magenta white (MW: RBW), yellow white (YW: RGW), and bright white (RGBW) illustrated in FIG. 5. Among these, seven colors of "pale red (RW), pale green (GW), pale blue (BW), cyan white (CW: GBW), magenta white (MW: RBW), yellow white (YW: RGW), and bright white (RGBW)" illustrated in a lower column of FIG. 5 are obtained by adding white to the colors of "red (R), green (G), blue (B), cyan (C: GB), magenta (M: RB), yellow (Y: RG), and white as a mixed color (RGB)" illustrated in an upper column of FIG. 5. In black (Blk) illustrated in FIG. 5, light is not transmitted through any of four sub-pixels, that is, red (R), green (G), blue (B), and white as a single color (W). When this state is changed to a state in which light is transmitted through the sub-pixel of white (W), white as a single color (W) is extended. That is, white as a single color (W) is obtained by adding white to black (Blk). As described above, eight colors illustrated in the lower column of FIG. 5 are obtained by adding white to eight colors illustrated in the upper column of FIG. 5. White as a mixed color (RGB) is extended when the light is transmitted through the sub-pixels of red (R), green (G), and blue (B) in the same degree.

FIG. 6 is a diagram illustrating an example of a replacement pattern of colors made by the first processing circuit 10. The first processing circuit 10 determines the colors of the pixels constituting the image based on a correspondence relation between the color value that can be adopted in the image and the predetermined number of colors. Specifically, the first processing circuit 10 replaces the color extended with each of the color values of the pixels constituting the image before image processing with any of the sixteen colors illustrated in FIG. 5 according to a rule indicated by table data illustrated in FIG. 6, for example. In the following description, a signal related to the color of one of the pixels constituting the image based on the image data before image processing is described as an "input image signal", and a combination of the color values of R, G, and B indicated by the signal is represented as follows: (R, G, B)=(Ri, Gi, Bi). Each of Ri, Gi, and Bi is any integer value in a range from the minimum value to the maximum value of each of the color values of R, G, and B (for example, 0 to 255). That is, the input image signal according to the embodiment is an RGB digital signal in which the color value of each color can be expressed in 8 bits.

The table data illustrated in FIG. 6 indicates minimum values of the color values of R, G, and B corresponding to 5 replaced colors (sixteen colors). As an example, when the input image signal is (R, G, B)=(255, 255, 255), the first processing circuit 10 replaces the input image signal with a signal indicating bright white (RGBW). When any one or more values of the input image signal are less than 255, the input image signal is not replaced with bright white (RGBW). For example, when the input image signal is (R, G, B)=(254, 255, 255), the first processing circuit 10 assumes that the input image signal corresponds to a combination of (R, G, B)=(127, 255, 255), and replaces the input image signal with a signal indicating cyan white (CW: GBW). Similarly, when the input image signal is (R, G, B)=(255, 254, 255), the first processing circuit 10 assumes that the input image signal corresponds to a combination of (R, G, B)=(255, 127, 255), and replaces the input image signal with magenta white (MW: RBW). When the input image signal is (R, G, B)=(255, 255, 254), the first processing circuit 10 assumes that the input image signal corresponds to (R, G, B)=(255, 255, 127), and replaces the input image signal with yellow white (YW: RGW). The first processing circuit 10 similarly replaces each of the other colors with the color indicated by the input image signal assuming that the table data illustrated in FIG. 6 indicates the minimum values of the color values of R, G, and B corresponding to the replaced colors (sixteen colors).

The table data illustrated in FIG. 6 only represents the replacement pattern of colors. Actually, the first processing circuit 10 includes hardware (a circuit) that converts the color in which the replacement pattern of colors is reflected. The input image signal input to the first processing circuit 10 mechanically passes through a signal processing path corresponding to an output of any color without arithmetic processing, and is output as a signal indicating a replaced color.

The correspondence relation between the input image signal and the replaced color illustrated in FIG. 6 and described above is merely an example. The embodiment is not limited thereto, and can be appropriately modified. Color distribution in the table can be appropriately modified due to various elements related to color extension such as a placement pattern and transmittance of the sub-pixel constituting the pixel included in the display unit 50 and a panel characteristic of the display unit 50. More specifically, the placement pattern in the table can be appropriately modified such that outputs of white are narrowed down to 1, or R and RW distinguished from each other in the table are all output as R. Due to this, output colors can be set to be equal to or smaller than 16 and equal to or more than RGB, white, and black, that is, 5 to 11 types of colors.

The following describes image processing performed by the second processing circuit 20. First, the following describes a basic principle in a case of replacing a combination of color values of R, G, and B indicated by the input image signal with a combination of color values of R, G, B, and W.

When the input image signal is the RGB digital signal as described above, assuming that signals of respective colors to be displayed on an RGBW pixel are Ro, Go, Bo, and Wo, the following expression (1) needs to be satisfied to prevent display quality of the displayed image from being changed.

$$Ri:Gi:Bi = Ro+Wo:Go+Wo:Bo+Wo \quad (1)$$

Where Max(Ri, Gi, Bi) is the maximum value of signals of Ri, Gi, and Bi, the following expressions (2) to (4) are satisfied. Accordingly, the following expressions (5) to (7) are satisfied.

$$Ri/\text{Max}(Ri,Gi,Bi) = (Ro+Wo)/(\text{Max}(Ri,Gi,Bi)+Wo) \quad (2)$$

$$Gi/\text{Max}(Ri,Gi,Bi) = (Go+Wo)/(\text{Max}(Ri,Gi,Bi)+Wo) \quad (3)$$

$$Bi/\text{Max}(Ri,Gi,Bi) = (Bo+Wo)/(\text{Max}(Ri,Gi,Bi)+Wo) \quad (4)$$

$$Ro = Ri \times ((\text{Max}(Ri,Gi,Bi)+Wo)/\text{Max}(Ri,Gi,Bi)Wo \quad (5)$$

$$Go = Gi \times ((\text{Max}(Ri,Gi,Bi)+Wo)/\text{Max}(Ri,Gi,Bi)Wo \quad (6)$$

$$Bo = Bi \times ((\text{Max}(Ri,Gi,Bi)+Wo)/\text{Max}(Ri,Gi,Bi)Wo \quad (7)$$

In these equations, Wo that can be set can be defined as a function of the minimum value Min(Ri, Gi, Bi) of Ri, Gi, and Bi as represented by the following expression (8). Herein, f is any coefficient. That is, as the simplest way of thinking, the following expression (9) is satisfied.

$$Wo = f(\text{Min}(Ri,Gi,Bi)) \quad (8)$$

$$Wo = \text{Min}(Ri,Gi,Bi) \quad (9)$$

Based on the above expressions (8) and (9), Wo=0 is satisfied when there is an image signal in which Min(Ri, Gi, Bi)=0. The luminance of the pixel is not improved. Even when Min(Ri, Gi, Bi)=0 is not satisfied, in a case in which Min(Ri, Gi, Bi) is a small value close to 0, a value of Wo also becomes small and a degree of improvement in the luminance is reduced.

The second processing circuit 20 performs image processing on all the pixels in one image. Due to this, simply following the basic principle, part of the image may be extremely bright and the other part does not become bright in some cases. Accordingly, for example, when there is a part the saturation of which is high (for example, a monochrome part) in a bright background the saturation of which is low, relatively large Wo can be set to the background, and on the other hand, relatively small Wo is set to the part having high saturation.

Generally, sensitivity of a human to colors and brightness (visual characteristics) is greatly influenced by a difference in brightness relative to surroundings, so that a part the brightness of which is relatively low (for example, the monochrome part described above) may seem to be dull. This phenomenon is what is called simultaneous contrast. Accordingly, in the embodiment, to solve a problem related to the simultaneous contrast in the image processing of replacing the color indicated by the RGB input image signal with a combination of RGBW colors, performed is white magic processing including arithmetic processing (expansion processing) for improving the luminance of the pixels constituting the image displayed corresponding to the image data. The following describes the white magic processing.

First, the following describes expansion processing of the input image signal. The expansion processing unit 24 expands the input image signals Ri, Gi, and Bi while keeping a ratio thereamong as represented by the following expressions (10) to (12) where α is a natural number.

$$Rj = \alpha \times Ri \quad (10)$$

$$Gj = \alpha \times Gi \quad (11)$$

$$Bj = \alpha \times Bi \quad (12)$$

To maintain display quality of the image signal, the expansion processing unit 24 preferably performs expansion processing to keep a ratio among the color values of R, G, and B (luminance ratio). The expansion processing unit 24 preferably performs expansion processing to maintain a gradation-luminance characteristic (gamma) of the input image signal. If the color space after the image processing is RGB, there is a limit in the expansion processing. In particular, when the color indicated by the input image signal is already bright, extension processing may be hardly performed in some cases.

In contrast, the display device 1 according to the embodiment is an RGBW-type, and a dynamic range of the luminance is widened because W is added, so that the color space that can be displayed is expanded. The expansion processing is performed to an upper limit value of the color space constituted with RGB and W. Accordingly, a conventional limit value 255 for RGB can be exceeded through the expansion processing.

For example, when the brightness of a W pixel is K times the brightness of an RGB pixel, the maximum value of Wo is considered to be 255×K. In this case, the values (luminance) of Rj, Gj, and Bj can be in a range up to (1+K)×255 in an RGBW color space. Accordingly, the luminance can be also improved for data of Min(Ri, Gi, Bi)=0 or a small value, which have been a problem in the related art.

Figure 7:
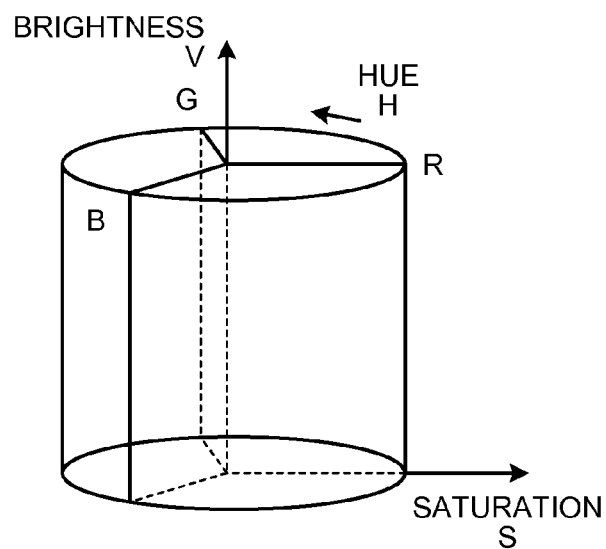
FIG. 7 is a diagram illustrating a color space of an RGB display device.
Figure 8:
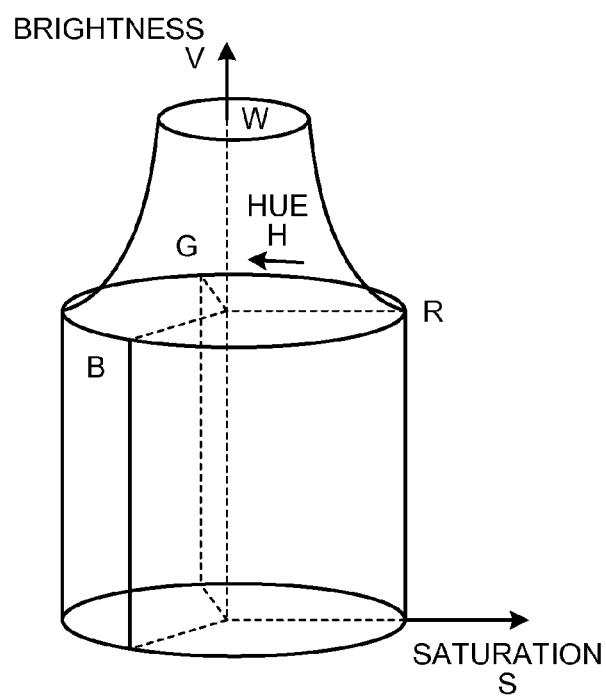
FIG. 8 is a diagram illustrating a color space of an RGBW display device.

FIG. 7 is a diagram illustrating the color space of an RGB display device. FIG. 8 is a diagram illustrating the color space of an RGBW display device. As illustrated in FIG. 7, all of the colors can be plotted on coordinates defined with a hue (H), saturation (S), and brightness (V: value of brightness). HSV as a kind of the color space is defined with attributes including the hue, the saturation, and the brightness. The hue represents a difference in color tone such as red, blue, and green, and is an attribute that can express a difference in an image the most. The saturation is one of indices that express colors, and is the attribute representing a degree of vividness of colors. The brightness is an attribute representing a degree of brightness of colors, and a higher numerical value thereof expresses a brighter color. In the HSV color space, the hue is represented in a circle from R as 0 degree toward G and B in a counterclockwise direction. The saturation represents how much gray is mixed into each color to be dulled. A case in which the color is the dullest is represented as 0%, and a case in which the color is not dulled at all is represented as 100%. The highest brightness is represented as 100%, and the lowest brightness is represented as 0%.

As illustrated in FIG. 8, although the attribute that defines the color space of the RGBW display device is basically the same as the attribute that defines the color space of the RGB display device, the brightness thereof is expanded because W is added thereto. In this way, a difference between the color spaces of the RGB display device and the RGBW display device can be represented in the HSV color space defined with the hue (H), the saturation (S), and the brightness (V). Due to this, it is found that the dynamic range of the brightness (V) expanded by adding W greatly varies depending on the saturation (S).

Accordingly, in the white magic processing, an attention is focused on that the coefficient α of Ri, Gi, and Bi signals as the input image signals in the expansion processing varies depending on the saturation (S). Specifically, the image analysis unit 22 analyzes the input image signals. The α-value determination unit 23 then determines the expansion coefficient value (α) for each image corresponding to an analysis result of the image analysis unit 22. Accordingly, the RGBW display device can display the image while maintaining the display quality before image processing.

Here, the α-value determination unit 23 preferably determines the expansion coefficient value (α) for each value from saturation (S)=0 to the maximum value (in a case of 8 bits, 255) by analyzing the input image signal. The α-value determination unit 23 may adopt the minimum value among obtained expansion coefficient values (α). Expansion processing can be performed without deteriorating the display quality before image processing at all. In the embodiment, the expansion processing is performed based on a ratio between a Max(R, G, B) value of the input image and a maximum brightness value V of the HSV color space. The α-value determination unit 23 calculates the ratio from a saturation value S=0 to the maximum value, and performs expansion processing using the minimum value thereof as the expansion coefficient value (α).

To maintain the display quality at the maximum, it is preferred to analyze the input image signals of all the pixels constituting one piece of image data. The analysis herein means processing for grasping Min(Ri, Gi, Bi) and Max(Ri, Gi, Bi), and the image analysis unit 22 performs this processing. On the other hand, to accelerate a processing speed of the white magic processing and reduce the image analysis unit 22 in size and a circuit scale of a circuit including the image analysis unit 22, the pixels constituting the image data are preferably sampled to be analyzed. Specifically, the image analysis unit 22 analyzes every n input image signals (herein, n is a natural number equal to or larger than 1), for example. As a method of determining the expansion coefficient value (α), a human engineering approach can be naturally adopted.

A slight local change in the Ri, Gi, and Bi signals as the input image signals cannot be perceived by a human. By causing the expansion coefficient value (α) to be a large value at a limit of perceiving the change in the display quality, the signal can be largely expanded without perceiving the change in the display quality. In other words, the second processing circuit 20 performs expansion processing in a range in which the change in the display quality cannot be perceived.

Figure 9:
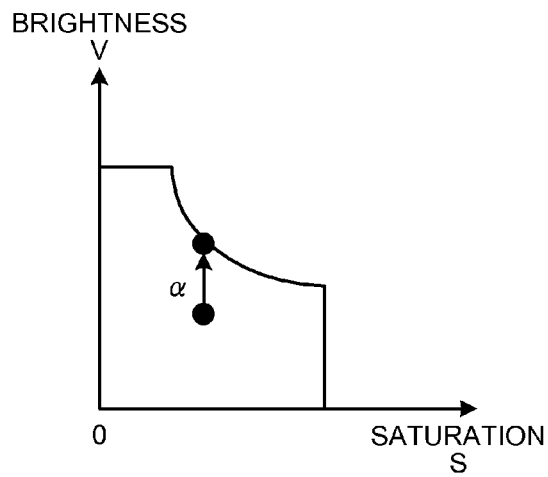
FIG. 9 is a cross-sectional view of an expanded color space of the RGBW display device.

As illustrated in FIG. 9, the signal (color value) after image processing is generated based on the expansion coefficient value (α) determined by comparing a level of an input video signal with an expanded RGBW color space.

Expanding the input image signal using the method described above allows a large value to be taken as Wo, and thus further improves the luminance of the entire image. Lowering the luminance of the backlight to 1/α according to the expansion coefficient value (α) allows the image to be displayed with the luminance that is completely the same as that of the input image signal in the transmissive liquid crystal display device.

Next, the following describes a method of determining Wo from expanded image signals Rj, Bj, and Gj. As described above, it is preferred that the minimum value Min(Rj, Gj, Bj) of each pixel is obtained by analyzing the expanded image signals Rj, Bj, and Gj to satisfy Wo=Min(Ri, Gi', Bi'). This is a possible maximum value of Wo. Accordingly, the expanded image signals Rj, Gj, and Bj are analyzed to obtain the minimum value Min(Rj, Gj, Bj) as Wo.

When Wo is determined using the method described above, other RGB image signals are obtained as represented by the following expressions (13) to (15).

$$Ro = Rj Wo \qquad (13)$$

$$Go = Gj Wo \qquad (14)$$

$$Bo = Bj Wo \qquad (15)$$

Expanding the input image signal using the method described above allows a larger value to be taken as Wo, and thus further improves the luminance of the entire image. Lowering the luminance of the backlight to $1/\alpha$ according to the expansion coefficient value ($\alpha$) allows the image to be displayed with the luminance that is completely the same as that of the input image signal.

The color value after the expansion processing described above is generated based on the expansion coefficient value ($\alpha$) determined by comparing a brightness level of the input image signal with the color space formed with RGBW. Accordingly, the expansion coefficient value ($\alpha$) is image analysis information obtained by analyzing one frame of image. When the expansion coefficient value ($\alpha$) is used in converting the image signal of the next frame, RGBW can be appropriately converted without accumulating the image signals in a frame memory.

The expansion coefficient value ($\alpha$) is determined by comparing the brightness level of the input image signal with the color space, so that the expansion coefficient value ($\alpha$) does not vary even when image information is slightly changed. For example, even when there is an image moving around in a screen, the expansion coefficient value ($\alpha$) is the same unless the luminance or chromaticity is largely changed. Accordingly, there is no problem in performing RGBW conversion using the expansion coefficient value ($\alpha$) determined in a previous frame.

In the embodiment, the gamma conversion unit 21 performs gamma conversion processing before image analysis by the image analysis unit 22. In the gamma conversion processing, the values of (Rj, Gj, Bj) are changed so that a correspondence relation between the gradation of the image and the luminance of the image in the input image signal, that is, the gradation-luminance characteristic (gamma) becomes a linear relation. The image analysis unit 22 according to the embodiment analyzes the input image signal on which the gamma conversion processing is performed. The reverse gamma conversion unit 25 returns the gradation-luminance characteristic (gamma) changed through the gamma conversion processing by the gamma conversion unit 21 to the correspondence relation before the gamma conversion processing. Through the gamma conversion processing before analysis processing and reverse gamma conversion processing after the expansion processing, the gradation-luminance characteristic (gamma) of the input image signal can be more securely maintained. The gamma conversion processing and the reverse gamma conversion processing can be omitted.

As described above, according to the embodiment, the second processing circuit 20 is caused to perform image processing, and when image processing is performed while more power is being saved than the second processing circuit 20, the first processing circuit 10 is caused to perform image processing. Causing the first processing circuit 10 to perform image processing can significantly reduce power consumption as compared with a case of applying image processing including arithmetic processing performed by the second processing circuit 20 to all the images. Accordingly, the power consumption can be more easily reduced in this embodiment. When the second processing circuit 20 performs image processing on an image that needs color extension with more than sixteen colors, the image can be displayed without reducing the number of colors thereof to sixteen or smaller. As described above, according to the embodiment, the power consumption can be reduced and the display quality can be maintained at the same time, and the power consumption can be more easily reduced.

The colors of the pixels constituting the image are determined based on a correspondence relation between the color value that can be adopted for the image and the predetermined number of colors. Due to this, the color can be replaced with a color closer to the color of the image before image processing in a range of sixteen or smaller colors used by the first processing circuit 10. Accordingly, the power consumption can be reduced while maintaining image expression with the colors of the image before image processing as much as possible.

The transmissive liquid crystal display device can reduce the power consumption by the backlight while maintaining the luminance of the image by lowering the brightness of the backlight corresponding to a degree of improvement in the luminance in the second processing circuit 20.

Using sub-pixels of R, G, B, and W allows sixteen color development in which W is added to the combination of R, G, and B. Accordingly, as compared with eight color development in which only R, G, and B are combined, an image using much more colors can be displayed even in the power-saving mode.

Blocking power supply and the like to the other circuit by switching the switching unit can reduce the power consumption more effectively. Specifically, causing any one of the first processing circuit 10 and the second processing circuit 20 to perform image processing and stopping the power supply to the other circuit can reduce waste of power consumption by the processing circuit that is not used.

In the above description, described is the input image signal of what is called 24-bit mode in which the color value (luminance) of each of red (R), green (G), and blue (B) is represented with an 8-bit signal. However, this is merely an example of a format of the input image signal and can be appropriately modified.

Figure 10:
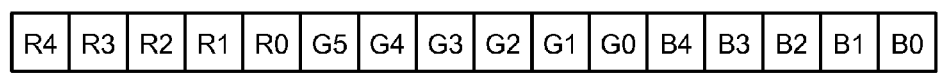
FIG. 10 is a diagram illustrating a bit distribution of RGB in a conventional 16-bit mode.

FIG. 10 is a diagram illustrating a bit distribution of RGB in a conventional 16-bit mode. For example, as illustrated in FIG. 10, in a combination of red (R), green (G), and blue (B) representing the color of one pixel, any of the colors (for example, green (G)) may be represented by a 6-bit signal, and the other colors may be represented by 5-bit signals. A distribution of a bit number for each color can be appropriately modified.

Figure 11:
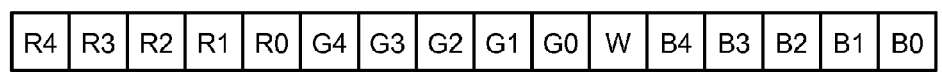
FIG. 11 is a diagram illustrating an example of an input format of a color value designated from the outside.

FIGS. 11 to 15 are diagrams illustrating an example of an input format of the color value designated from the outside. The power-saving mode using the first processing circuit 10 may adopt the input image signal to which information indicating whether to use white as a single color (W) is added from the outside in advance. Specifically, for example, as illustrated in FIG. 11, the last 1 bit (G0) among 6 bits of green (G) in FIG. 10 may be used as a binary value (1 or 0) indicating whether to use white as a single color (W). The first processing circuit 10 adopts any of the colors illustrated in the lower column of FIG. 5 in a case of a color to which white as a single color (W) is applied, and adopts any of the colors illustrated in the upper column of FIG. 5 in a case of a color to which white as a single color (W) is not applied.

Figure 12:
FIG. 12 is a diagram illustrating an example of the input format of the color value designated from the outside.
Figure 13:
FIG. 13 is a diagram illustrating an example of the input format of the color value designated from the outside.

As illustrated in FIGS. 12 and 13, in a combination of red (R), green (G), blue (B), and white as a single color (W), a 4-bit signal combining 1-bit signals indicating whether to use each color may be used as a signal representing the color of one pixel. FIG. 12 illustrates an example in which the 4-bit signal is adopted (for 4 pixels) for the conventional 16-bit mode. FIG. 13 illustrates an example in which the 4-bit signal is adopted (for 4 pixels) for the conventional 24-bit mode. With this method, all of the sixteen colors illustrated in FIG. 5 can be represented with a minimum bit number, so that the input image signal can be transmitted in higher density. Accordingly, power consumption such as communication power for transmitting the input image signal can be further reduced in managing the input image signal.

Figure 14:
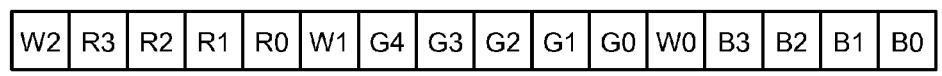
FIG. 14 is a diagram illustrating an example of the input format of the color value designated from the outside.

As illustrated in FIG. 14, part of higher-order bits of each color (for example, a highest-order bit) in FIG. 10 may be used as the information indicating whether to use white as a single color (W). As illustrated in FIG. 15, in the 24-bit mode, part of lower-order bits of each color (for example, two lower-order bits) may be used as the information indicating whether to use white as a single color (W). The method of using the higher-order bit as illustrated in FIG. 14 may be adopted for the 24-bit mode, and the method of using the lower-order bit as illustrated in FIG. 15 may be adopted for the 16-bit mode. A concept of the 16-bit mode signal or the 24-bit mode signal illustrated in FIGS. 10 to 15 can be appropriately applied to the input image signal having a different bit number.

In a case of using the method as illustrated in FIGS. 14 and 15, when the input image signal is possibly processed not only by the first processing circuit 10 but also by the second processing circuit 20, an intermediate color can be represented with the information of white as a single color (W) using a plurality of bits. If the display unit 50 provided to the display panel 2 is a display unit compatible with the RGB color space, color extension can be performed without using the information of white as a single color (W). When the method illustrated in FIG. 14 is used for example, each of the color values of red (R), green (G), and blue (B) may be halved. When the method illustrated in FIG. 15 is used, influence on other colors is reduced because white as a single color (W) is the lower-order bit. Accordingly, a color change becomes smaller even in color extension in the RGB color space.

In the method illustrated in FIGS. 11, 14, and 15, the color represented with a plurality of bits can be replaced with sixteen colors using the first processing circuit 10 in an optional manner. For example, the first processing circuit 10 may replace the colors according to a rule of determining presence or absence of each color from the highest-order bit of each color. The input image signal may be generated based on this rule. In this case, a bit value other than the highest-order bit may be any value. When this rule is adopted, the replacement pattern illustrated in FIG. 6 is not adopted.

Figure 16:
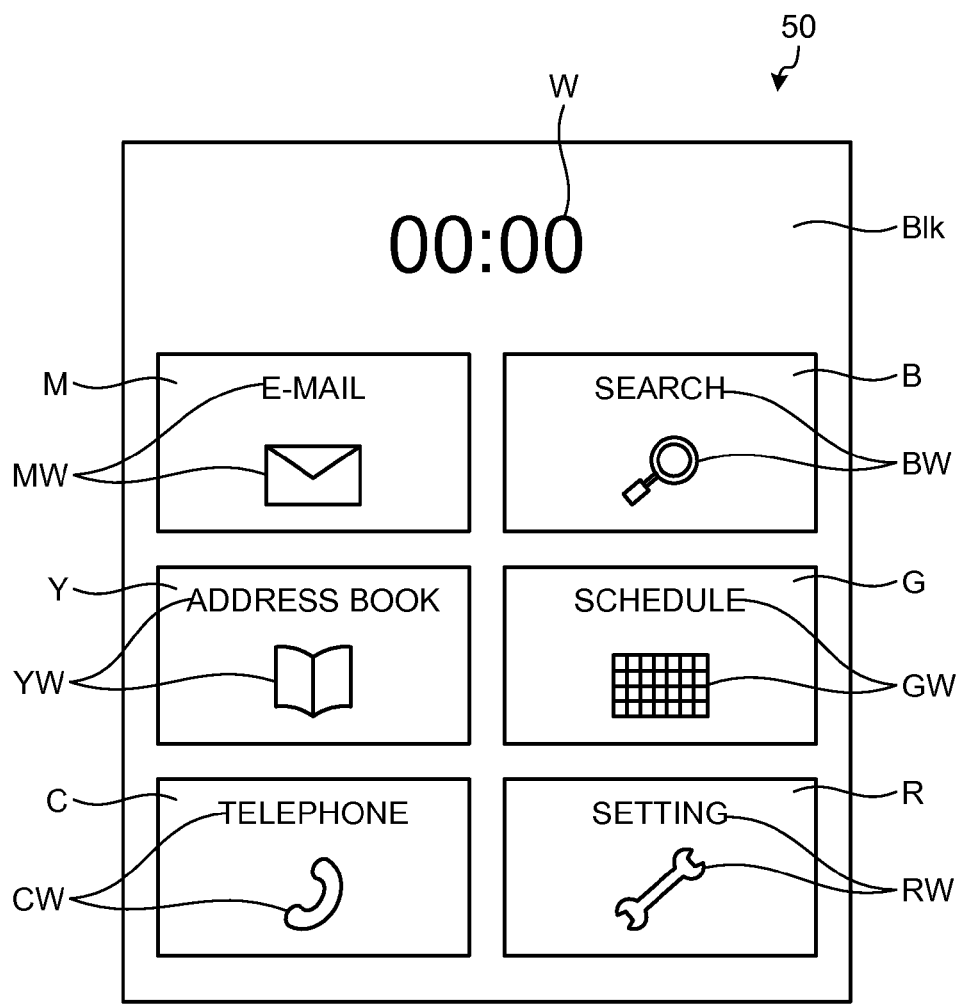
FIG. 16 is a diagram illustrating an example of the input format of the color value designated from the outside.

The replacement pattern of colors made by the first processing circuit 10 does not necessarily correspond to the color indicated by the input image signal. FIG. 16 is a diagram illustrating an example of a color used in each display section in a partitioned display area. The first processing circuit 10 may determine each color of the pixels corresponding to a correspondence relation between coordinates of each of the pixels and a position in the display area of the display device 1. As illustrated in FIG. 16 for example, information indicating what color can be used at a certain position in the display area of the display unit 50 (replacement information) is reflected in implementation of the first processing circuit 10. The first processing circuit 10 uses the coordinates of the pixel indicated by the input image signal as information indicating the replaced color, and neglects information about the color indicated by the input image signal.

The color replacement based on the correspondence relation between the coordinates of the pixel and the position in the display area of the display device is especially effective in a case of displaying an image of a predetermined format, for example. Specifically, on a top screen of a mobile device as illustrated in FIG. 16, information can be sufficiently displayed only with a background color of each display section and another color for displaying the information in the display section in which the background color is used. Accordingly, power consumption can be reduced by replacing colors on such a screen by the first processing circuit 10. In a case of FIG. 16, for example, display of time information (W) with respect to the entire background (Blk) is one display section. Rectangular regions for "e-mail", "search", "address book", "schedule", "telephone", and "setting" are respective display sections corresponding to these titles. In each of the display sections, any of the eight colors in the upper column illustrated in FIG. 5 is used as the background color. In each of the display sections, any of the eight colors in the lower column illustrated in FIG. 5 is used as a figure representing information (such as a title and a symbol figure). A plurality of patterns of replacement information may be provided. In this case, for example, which of the patterns of replacement information is adopted is determined according to an input via an input unit separately arranged (such as a touch panel arranged on the display unit 50).

Application Example

Figure 17:
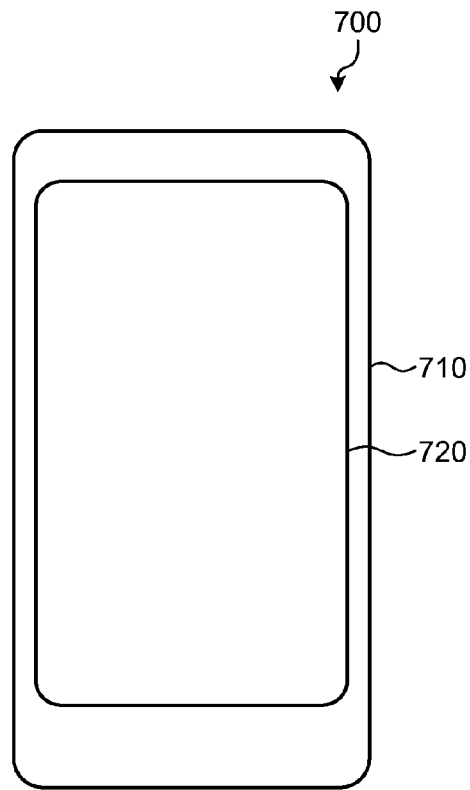
FIG. 17 is a diagram illustrating an example of an external appearance of a smartphone to which the display device according to the present invention is applied.

Next, with reference to FIG. 17, the following describes an application example of the display device 1 described in the above embodiment. The display device 1 described in the above embodiment can be applied to electronic apparatuses in various fields such as a smartphone. In other words, such a display device can be applied to electronic apparatuses in various fields that display a video signal input from the outside or a video signal generated inside as an image or video.

FIG. 17 is a diagram illustrating an example of an external appearance of a smartphone 700 to which the display device 1 according to the present invention is applied. The smartphone 700 includes, for example, a display device 720 arranged on one surface of a housing 710 thereof. The display device 720 is constituted of the display device 1 according to the invention.

The image processing unit 3 is not necessarily integral with the display panel 2. A device on which the image processing unit 3 is arranged may be coupled to a display device such as the display panel 2 via wiring such as the flexible printed board 4 described above, for example.

The above embodiment describes a case of using the transmissive liquid crystal display device. However, this is merely an example of a specific form of the display device, and the embodiment is not limited thereto. For example, the display device according to the invention may be a reflective liquid crystal display device.

Figure 18:
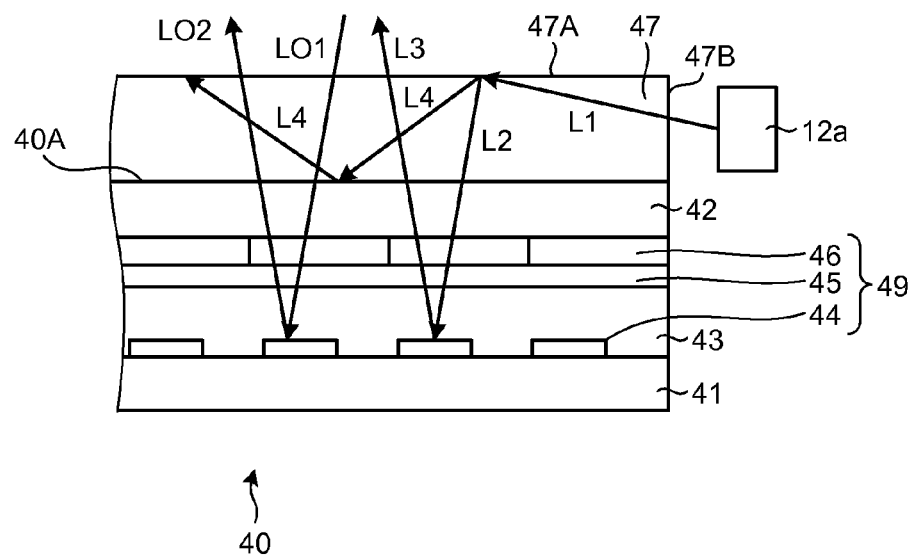
FIG. 18 is a schematic diagram of a cross-sectional structure of a reflective liquid crystal display device.

FIG. 18 is a schematic diagram of a cross-sectional structure of the reflective liquid crystal display device. As illustrated in FIG. 18, an image display panel 40 adopted for the reflective liquid crystal display device includes an array substrate 41 and a counter substrate 42 opposed to each other, and a liquid crystal layer 43, in which liquid crystal elements are sealed, arranged between the array substrate 41 and the counter substrate 42.

The array substrate 41 includes a plurality of pixel electrodes 44 on a surface facing the liquid crystal layer 43. The pixel electrode 44 is coupled to a signal line DTL via a switching element, and an image output signal as a video signal is applied thereto. The pixel electrode 44 is a reflective member made of aluminum or silver, for example, and reflects external light or light from a light source unit 12a functioning as a front light. That is, in the embodiment, the pixel electrode 44 constitutes a reflection unit.

The counter substrate 42 is a transparent substrate such as a glass substrate. The counter substrate 42 includes a counter electrode 45 and color filters 46 on a surface facing the liquid crystal layer 43. More specifically, the counter electrode 45 is arranged on the surface of the color filter 46 facing the liquid crystal layer 43.

The counter electrode 45 is made of, for example, transparent conductive material such as indium tin oxide (ITO) or indium zinc oxide (IZO). The counter electrode 45 is coupled to the switching element to which the pixel electrode 44 is coupled. The pixel electrode 44 and the counter electrode 45 are arranged to be opposed to each other, so that the pixel electrode 44 and the counter electrode 45 generate an electric field in the liquid crystal layer 43 when a voltage of the image output signal is applied between the pixel electrode 44 and the counter electrode 45. The liquid crystal elements are twisted due to the electric field generated in the liquid crystal layer 43 and a double refractive index is changed, and the reflective liquid crystal display device adjusts an amount of light reflected by the image display panel 40. The image display panel 40 is what is called a vertical electric field type. Alternatively, the image display panel 40 may be a horizontal electric field type that generates the electric field in a direction parallel with a display surface of the image display panel 40.

The color filter 46 includes the first color filter, the second color filter, and the third color filter described above, and is provided in plurality corresponding to the pixel electrodes 44. Each of the pixel electrode 44, the counter electrode 45, and the color filter 46 constitutes a sub-pixel 49.

A light guide plate 47 is arranged on a surface of the counter substrate 42 that is opposite to the liquid crystal layer 43. The light guide plate 47 is, for example, a transparent plate member made of acrylic resin, polycarbonate (PC) resin, methyl methacrylate-styrene copolymer (MS resin), and the like. An upper surface 47A of the light guide plate 47 that is opposite to the counter substrate 42 is subjected to prism processing.

The light source unit 12a is, for example, an LED. As illustrated in FIG. 18, the light source unit 12a is arranged along a side surface 47B of the light guide plate 47. The light source unit 12a irradiates the image display panel 40 with light from a front surface of the image display panel 40 via the light guide plate 47. The light source unit 12a is switched ON or OFF by an operation of an image observer, an external light sensor that is mounted on the reflective liquid crystal display device to measure external light, or the like. The light source unit 12a emits light in an ON state, and does not emit light in an OFF state. For example, when the image observer feels that the image is dark, the image observer turns ON the light source unit 12a to cause the light source unit 12a to irradiate the image display panel 40 with light to cause the image to be bright. When the external light sensor determines that external light intensity is smaller than a predetermined value, the second processing circuit 20, for example, turns ON the light source unit 12a to cause the light source unit 12a to irradiate the image display panel 40 with light to cause the image to be bright. In a case of using the reflective liquid crystal display device, no backlight is provided. In a case of using the reflective liquid crystal display device, control of the backlight using the expansion coefficient value (α) is omitted.

In the above embodiment, the liquid crystal display device is exemplified. Other application examples include, but are not limited to, various flat-panel type display devices such as an organic EL display device, another self-luminous display device, or an electronic paper display device including an electrophoresis element and the like. It goes without saying that any of a medium size, a small size, and a large size can be applied without specific limitations.

When in the power-saving mode, update frequency of the image (refresh rate) may be lowered as compared with a case when not in the power-saving mode. Specifically, output frequency of the signal output from the first processing circuit 10, that is, output frequency of the signal constituting the image data after image processing may be caused to correspond to the refresh rate that is lowered as compared with the refresh rate when not in the power-saving mode. Lowering the refresh rate can further reduce the power consumption in the power-saving mode.

In the above embodiment, the first processing circuit 10 manages the sixteen colors illustrated in FIG. 5. However, these colors are merely specific examples of colors managed by the first processing circuit 10, and the embodiment is not limited thereto. Specific colors managed by the first processing circuit 10 can be appropriately modified. The number of colors managed by the first processing circuit 10 may be any natural number equal to or smaller than 16. As a specific example, the colors to be managed by the first processing circuit 10 may be the eight colors illustrated in the upper column of FIG. 5 or the eight colors illustrated in the lower column of FIG. 5. The first processing circuit 10 uses the eight colors to which white is added as illustrated in the lower column of FIG. 5 for the image to cause the image after image processing to be bright.

The color to be added through the image processing is not limited to W, and can be appropriately modified depending on the color of the sub-pixel constituting the display unit 50. Specifically, for example, the sub-pixel of another color such as yellow as a single color (Y) may be adopted instead of white as a single color (W). Alternatively, a complementary color of any of red (R), green (G), and blue (B) may be adopted instead of white as a single color (W). The expansion processing may be processing that improves the luminance of the image while keeping the color space indicated by the input image signal.

The color and the bit number of the color value adopted for the input image signal in the above embodiment are merely an example, and can be appropriately modified. For example, the replacement pattern (refer to FIG. 6) of the colors made by the first processing circuit 10 is also appropriately modified depending on the color and the bit number of the color value adopted for the input image signal. The same applies to details about the processing performed by the second processing circuit 20.

Another working effect caused by the aspects described in the above embodiment that is obvious from the description herein or that is appropriately conceivable by those skilled in the art is naturally interpreted as being obtained by the present invention.

According to the embodiment, the present disclosure includes the following aspects.

(1) A display device including an image processing unit that performs image processing on image data input from outside, and performing display output corresponding to the image data on which image processing is performed by the image processing unit,
the image processing unit including:
a first processing circuit that simply replaces colors of an image to limit number of colors used for the image to a predetermined number equal to or smaller than 16;

a second processing circuit that performs image processing including arithmetic processing for improving luminance of a plurality of pixels constituting the image displayed on the display device corresponding to the image data; and a switching unit that causes any one of the first processing circuit and the second processing circuit to perform image processing, wherein the switching unit causes the second processing circuit to perform image processing, and causes the first processing circuit to perform image processing when performing the image processing while saving more power than the second processing circuit.

(2) The display device according to (1), wherein the first processing circuit determines each color of the pixels corresponding to a correspondence relation between coordinates of each of the pixels and a position in a display area of the display device.

(3) The display device according to (1), wherein the first processing circuit is capable of using, for the image, eight colors to which white is added.

(4) The display device according to (1), wherein the first processing circuit determines colors of the pixels constituting the image based on a correspondence relation between a color value that is adoptable for the image and the predetermined number of colors.

(5) The display device according to (1), wherein the display device is a transmissive liquid crystal display device.

(6) The display device according to (1), wherein the display device is a reflective liquid crystal display device.

(7) An image processing device that performs image processing on image data input from outside and outputs the image data to a display device, the image processing device including:

a first processing circuit that simply replaces colors of an image to limit number of colors used for the image to a predetermined number equal to or smaller than 16;

a second processing circuit that performs image processing including arithmetic processing for improving luminance of a plurality of pixels constituting the image displayed on the display device corresponding to the image data; and a switching unit that causes any one of the first processing circuit and the second processing circuit to perform image processing, wherein the switching unit causes the second processing circuit to perform image processing, and causes the first processing circuit to perform image processing when performing the image processing while saving more power than the second processing circuit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
an image processing unit that performs image processing on image data input from outside; and
an image displaying unit configured to display an image corresponding to the image data on which image processing is performed by the image processing unit,
wherein the image displaying unit includes a plurality of pixels each including a red subpixel, a green subpixel, a blue subpixel, and a white subpixel,
wherein the pixels constitute the image by using any combination of the red subpixel, the green subpixel, the blue subpixel, and the white subpixel,
wherein the image processing unit comprises:
a first processing circuit configured to obtain color data of the pixels used for the image by replacing the image data with table pixel colors based on a replacement table that shows relations of the table pixel colors and the image data, the number of different table pixel colors being limited to a predetermined number equal to or smaller than 16;
a second processing circuit configured to perform image processing including arithmetic processing for improving luminance of the pixels; and
a switching unit configured to cause any one of the first processing circuit and the second processing circuit to perform image processing,
wherein the table pixel colors in the replacement table include a plurality of white colors, the white colors including:
a mixed white using the red subpixel, the green subpixel, and the blue subpixel;
a single-subpixel white using only the white subpixel; and
a bright white using the red subpixel, the green subpixel, the blue subpixel, and the white subpixel, and
wherein the switching unit causes the second processing circuit to perform image processing, and causes the first processing circuit to perform image processing when performing the image processing while saving more power than the second processing circuit.

2. The display device according to claim 1, wherein table pixel colors include eight different colors which are realized by using a combination of the white subpixel and at least one of the red subpixel, the green subpixel, and the blue subpixel, and
wherein the eight different colors include the single-subpixel white and the bright white.

3. The display device according to claim 1, wherein the first processing circuit determines the color data of the pixels based on a correspondence relation between a color value that is adoptable for the image and the table pixel colors.

4. The display device according to claim 1, wherein the display device is a transmissive liquid crystal display device.

5. The display device according to claim 1, wherein the display device is a reflective liquid crystal display device.

6. The display device according to claim 1, wherein the table pixel colors in the replacement table include at least the mixed white, the single-subpixel white, and the bright white.

7. An image processing device that performs image processing on image data input from outside and outputs the image data on which image processing is performed by the image processing unit to an image displaying unit that displays an image corresponding to the image data and that includes a plurality of pixels each including a red subpixel, a green subpixel, a blue subpixel, and a white subpixel, the pixels constitute the image by using any combination of the red subpixel, the green subpixel, the blue subpixel, and the white subpixel, the image processing device comprising:

a replacement table showing replacement patterns, each of the replacement patterns including:
a combination of input signals of the image data; and
a table pixel color of each of the pixels corresponding to the combination of the input signals;

a first processing circuit that is configured to obtain color data of the pixels used for the image by determining table pixel colors related to the combinations of the input signals based on the replacement table, the number of different table pixel colors being limited to a predetermined number equal to or smaller than 16;

a second processing circuit that performs image processing including arithmetic processing for improving luminance of the pixels; and a switching unit that causes any one of the first processing circuit and the second processing circuit to perform image processing, wherein the table pixel colors in the replacement table include a plurality of white colors, the white colors including:

a mixed white using the red subpixel, the green subpixel, and the blue subpixel;

a single-subpixel white using only the white subpixel; and a bright white using the red subpixel, the green subpixel, the blue subpixel, and the white subpixel, and wherein the switching unit causes the second processing circuit to perform image processing, and causes the first processing circuit to perform image processing when performing the image processing while saving more power than the second processing circuit.

8. The image processing device according to claim 7, wherein the table pixel colors in the replacement table include at least the mixed white, the single-subpixel white, and the bright white.

* * * * *